(12) United States Patent
Ozeki et al.

(10) Patent No.: US 8,560,745 B2
(45) Date of Patent: Oct. 15, 2013

(54) STORAGE DEVICE, STORAGE DEVICE ARRAY AND DATA PROCESSING SYSTEM

(75) Inventors: Shinobu Ozeki, Kanagawa (JP); Masaru Kijima, Kanagawa (JP); Junji Okada, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 911 days.

(21) Appl. No.: 12/396,532

(22) Filed: Mar. 3, 2009

(65) Prior Publication Data

US 2010/0037021 A1 Feb. 11, 2010

(30) Foreign Application Priority Data

Aug. 11, 2008 (JP) ................. 2008-206886

(51) Int. Cl.
*G06F 13/12* (2006.01)
*G06F 13/38* (2006.01)
*G06F 12/08* (2006.01)
*G06F 13/42* (2006.01)

(52) U.S. Cl.
USPC ............................. 710/74; 710/106; 711/114

(58) Field of Classification Search
USPC .......................................................... 710/74
See application file for complete search history.

(56) References Cited

U.S. PATENT DOCUMENTS

| | | | |
|---|---|---|---|
| 6,233,502 B1 | 5/2001 | Yim | |
| 6,282,610 B1 * | 8/2001 | Bergsten | ........................ 711/114 |
| 2002/0054410 A1 | 5/2002 | Ishikawa et al. | |
| 2006/0257143 A1 * | 11/2006 | Cavazzoni et al. | ............... 398/49 |
| 2007/0043898 A1 * | 2/2007 | Ozeki et al. | .................... 711/100 |
| 2008/0005514 A1 | 1/2008 | Kurokawa et al. | |
| 2008/0168240 A1 | 7/2008 | Nagata et al. | |
| 2009/0196620 A1 | 8/2009 | Ozeki et al. | |

FOREIGN PATENT DOCUMENTS

| | | |
|---|---|---|
| JP | 04-276813 | 10/1992 |
| JP | 07-123050 | 5/1995 |
| JP | 2000-117672 | 4/2000 |
| JP | 2000-267817 | 9/2000 |
| JP | 2002-23899 | 1/2002 |
| JP | 2007-004271 | 1/2007 |
| JP | 2007-304779 | 11/2007 |
| JP | 2007-328408 | 12/2007 |
| JP | 2008-171032 | 7/2008 |
| JP | 2009-187185 | 8/2009 |

* cited by examiner

*Primary Examiner* — Chun-Kuan Lee
*Assistant Examiner* — Brooke Taylor
(74) *Attorney, Agent, or Firm* — Fildes & Outland, P.C.

(57) ABSTRACT

A storage device includes a data storage section, a first control section, a communication section, a second control section and a wireless transmission/reception section. The data storage section stores data. The first control section controls reading and writing the data from and into the data storage section. The communication section transmits and receives the data through a transmission line to and from a host device. The second control section transmits and receives the data to and from the first control section and the communication section. The wireless transmission/reception section is connected to the first and second control sections, is directed toward a predetermined direction, and wirelessly transmits and receives data to and from another storage device provided in the predetermined direction.

13 Claims, 14 Drawing Sheets

*O-B: Optical branch section
*O-M: Optical multiplexing section

STORAGE DEVICE, STORAGE DEVICE ARRAY AND DATA PROCESSING SYSTEM

CROSS-REFERENCE TO RELATED APPLICATIONS

This application is based on and claims priority under 35 USC 119 from Japanese Patent Application No. 2008-206886 filed on Aug. 11, 2008.

BACKGROUND

Technical Field

The invention relates to a storage device, a storage device array and a data processing system.

SUMMARY

According to an aspect of the invention, a storage device includes a data storage section, a first control section, a communication section, a second control section and a wireless transmission/reception section. The data storage section stores data. The first control section controls reading and writing the data from and into the data storage section. The communication section transmits and receives the data through a transmission line to and from a host device. The second control section transmits and receives the data to and from the first control section and the communication section. The wireless transmission/reception section is connected to the first and second control sections, is directed toward a predetermined direction, and wirelessly transmits and receives data to and from another storage device provided in the predetermined direction.

BRIEF DESCRIPTION OF THE DRAWINGS

Exemplary embodiments of the invention will be described in detail based on the following figures, wherein.

DETAILED DESCRIPTION

A storage device according to an exemplary embodiment of the invention includes a data storage section, a first control section, a communication section, a second control section and a wireless transmission/reception section. The data storage section stores data. The first control section controls reading and writing the data from and into the data storage section. The communication section transmits and receives the data through a transmission line to and from a host device. The second control section transmits and receives the data to and from the first control section and the communication section. The wireless transmission/reception section is connected to the first and second control sections, is directed toward a predetermined direction, and wirelessly transmits and receives data to and from another storage device provided in the predetermined direction.

With this configuration, this storage device and said another storage device are arranged to be directed in such directions that the data transmission/reception can be performed therebetween by the wireless transmission/reception section. Thereby, the both storage devices can communicate with each other without using a host device, so that a load on the host device is reduced. Further, since the communication between this storage device and said another storage device is performed wirelessly, connection work by means of a transmission cable is not required.

First Exemplary Embodiment

Figure 1:
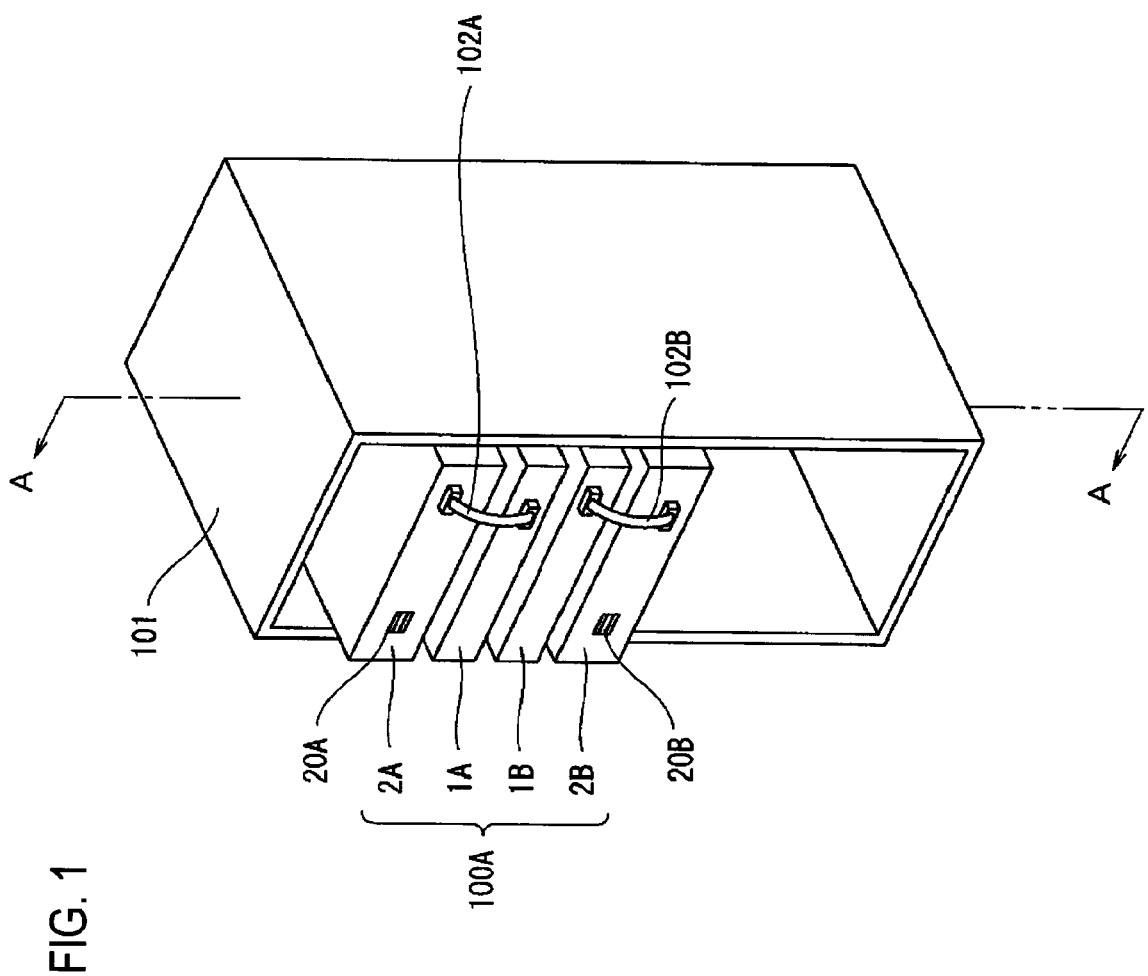
FIG. 1 is a perspective view showing an example of the schematic configuration of a data processing system according to a first exemplary embodiment of the invention.
Figure 2:
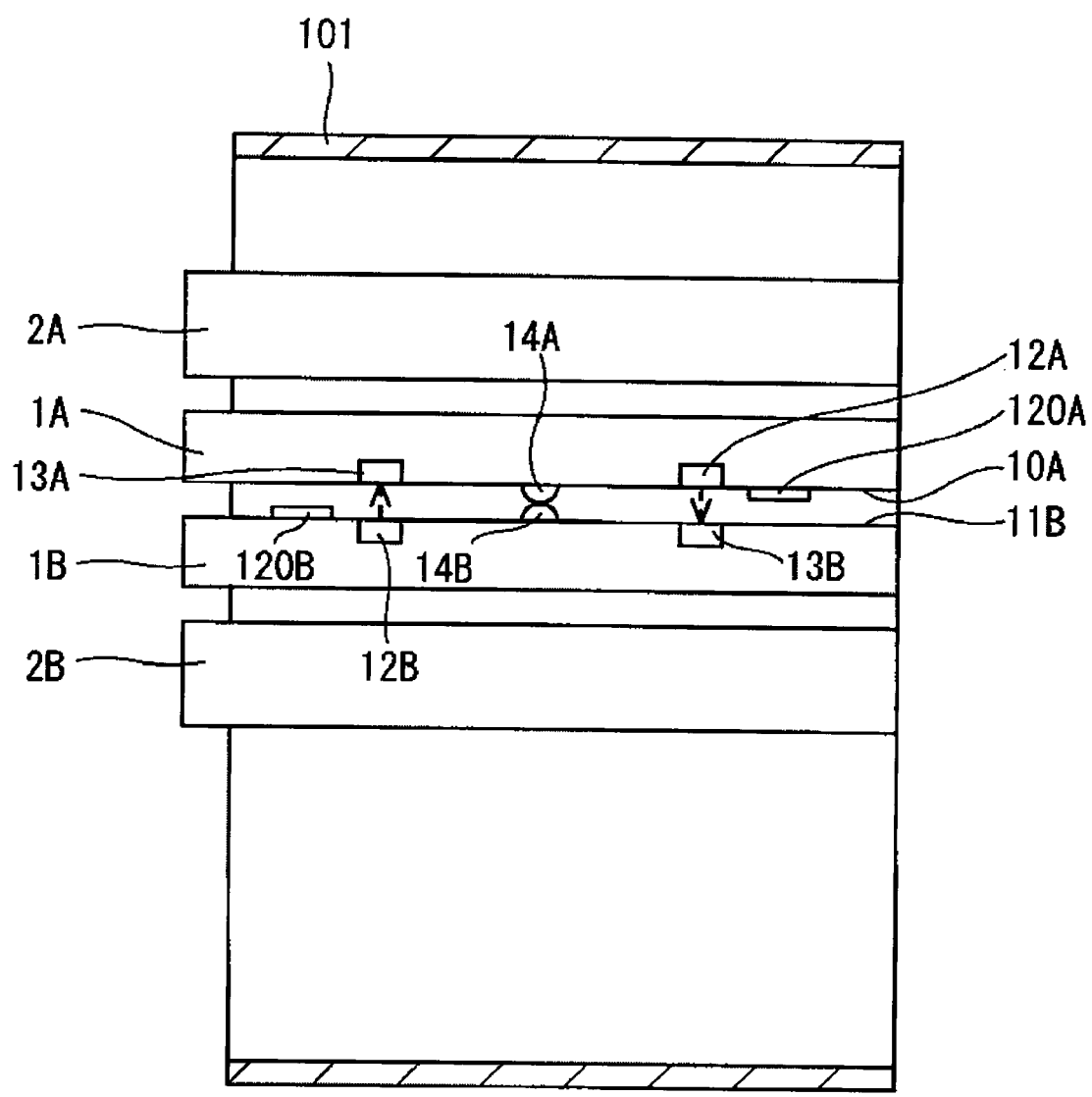
FIG. 2 is a section view taken along a line A-A in FIG. 1.

FIG. 1 is a perspective view showing an example of the schematic configuration of a data processing system according to a first exemplary embodiment of the invention. FIG. 2 is a section view taken along a line A-A in FIG. 1.

This data processing system 100A is detachably housed in a box-shaped rack 101 whose side surfaces opposed to each other are opened. The data processing system 100A includes first and second host devices 2A and 2B provided in an upper step and a lower step in the rack 101, and first and second storage devices 1A and 1B provided between the first host device 2A and the second host device 2B.

A size of the rack 101 is determined, for example, in accordance with the standard such as JIS or EIA. A width of the rack 101 is, for example, 19 inches. Further, only one-side surface of the rack 101 may be opened.

The first host device 2A and the first storage device 1A function as a current system that operates at a normal time. The second host device 2B and the second storage device 1B function as a standby system that operates when failure occurs in the current system. The second storage device 1B is a storage device functioning as a backup device for data stored in the first storage device 1A.

(Host Device)

The first and second host devices 2A and 2B are host devices for processing data and request the storage devices 1A and 1B to read and write data. The host devices 2A, 2B may be implemented by, for example, a server, a computer (PC), a work station (WS) or the like.

The first host device 2A is connected through a cable 102A to the first storage device 1A, and the second host device 2B is connected through a cable 102B to the second storage device 1B. The first and second host devices 2A and 2B transmit and receive data to and from the first and second storage devices 1A and 1B to which the host device 2A and 2B are respectively connected, in accordance with an interface standard such as USB, IEEE 1394, serial ATA, SAS, fiber channel, InfiniBand, PCI, Express or SCSI. The cables 102A and 102B may be optical cables or electric cables.

The first and second host devices 2A and 2B include ports 20A and 20B that may be connected to a communication network such as a local area network (LAN) or the Internet. The first and second host devices 2A and 2B can transmit and receive data through the ports 20A and 20B to and from another host device or a terminal device. Also, the cables 102A, 102B and the ports 20A, 20B may be provided on an opposite side surface to the side surface shown in FIG. 1, or may be provided separately on the different side surfaces.

(Storage Device)

The first and second storage devices 1A and 1B are housed in the rack 101 in order from the upper side. Data transmission/reception is performed between the first storage device 1A and the second storage device 1B by wireless communication. The wireless communication includes optical communication, communication by electromagnetic waves such as electric waves that are longer in wavelength than light, and communication by means of electromagnetic induction. In this exemplary embodiment, the case where the optical data transmission/reception is used will be described.

The first and second storage devices 1A and 1B have plate-shaped housings having a predetermined thickness, and have lower surfaces 10A, 10B of the housings and upper surfaces 11A, 11B of the housings.

An optical transmission section 12A (an example of a wireless transmission section), an optical reception section 13A (an example of a wireless reception section) and a contact member 14A are provided on the lower surface 10A of the first storage device 1A. The optical transmission section 12A is directed toward the second storage device 1B and transmits an optical signal to the second storage device 1B. The optical reception section 13A is similarly directed toward the second storage device 1B and receives an optical signal from the second storage device 1B.

An optical transmission section 12B (an example of a wireless transmission section), an optical reception section 13B (an example of a wireless reception section) and a contact member 14 are provided on the upper surface 11B of the second storage device 1B. The optical transmission section 12B is directed toward the first storage device 1A and transmits an optical signal to the first storage device 1A. The optical reception section 13B is similarly directed toward the first storage device 1A and receives an optical signal from the first storage device 1A.

The optical transmission sections 12A and 12B provided for the first and second storage devices 1A and 1B include shutters 120A and 120B for blocking optical signals. When another storage device is not arranged, the shutters 120A and 120B are brought into a close state to block optical signals from the optical transmission sections 12A, 12B. When another storage device is arranged, the shutters 120A and 120B are brought into an open state to transmit optical signals from the optical transmission section 12A, 12B. Another storage device for the first storage device 1A is the second storage device 1B, and another storage device for the second storage device 1B is the first storage device 1A.

The contact member 14A of the first storage device 1A and the contact member 14B of the second storage device 1B have detection circuits (not shown) that detect, when thee contact members 14A and 14B come into contact with each other, its contact by, for example, an electric method such as flowing of current. When the contact members 14A and 14B are located in positions where the contact members 14A and 14B come into contact with each other, the optical transmission section 12A and the optical reception section 13B are arranged in positions where they face each other, and the optical transmission section 12B and the optical reception section 13A are arranged in positions where they face each other. Thereby, the data transmission/reception between the first and second storage devices 1A and 1B can be performed by the optical signal. In this case, an optical signal transmitted from the optical transmission section to the optical reception section arranged in the opposed position propagates in space existing therebetween. Further, the method of detecting whether or not another device is arranged in the opposed position may be a physical method by means of a sensor or a switch.

Thus, by connecting the adjacent storage devices by the optical signal, it becomes possible to deal with hot plug in which another storage device is connected to one storage device while current is still flowing in the one storage device, without considering attention matters when the storage devices are electrically connected, such as through-current and a difference in voltage level of signal.

Also, the transmission bands inside the first and second storage devices 1A and 1B are so configured as to be higher than the transmission bands between their devices 1A, 1B and the host devices 2A, 2B connected to the devices 1A, 1B. As a method for enhancing the transmission band, there are, for example, a method of increasing transmission frequency, a method of increasing the number of transmission bits, and a method of performing multivalued transmission.

The first and second storage devices 1A and 1B are arranged in order from the upper side in FIG. 1. However, the first and second storage devices 1A and 1B are arranged in any manner so long as data can be transmitted and received between adjacent storage devices. For example, the first and second storage devices 1A and 1B may be arranged side by side in the rack 101. Further, the optical transmission sections 12A and 12B may be provided at either the inside or outside of the housing 101 so long as the optical transmission sections 12A and 12B are located in positions where they can transmit the optical signals toward the optical reception sections which are transmission destinations. Also, similarly, the optical reception sections 13A and 13B may be provided at either the inside or outside of the housing 101 so long as they are located in positions where they can receive optical signals that are transmitted from the counterpart optical transmission sections.

Figure 3:
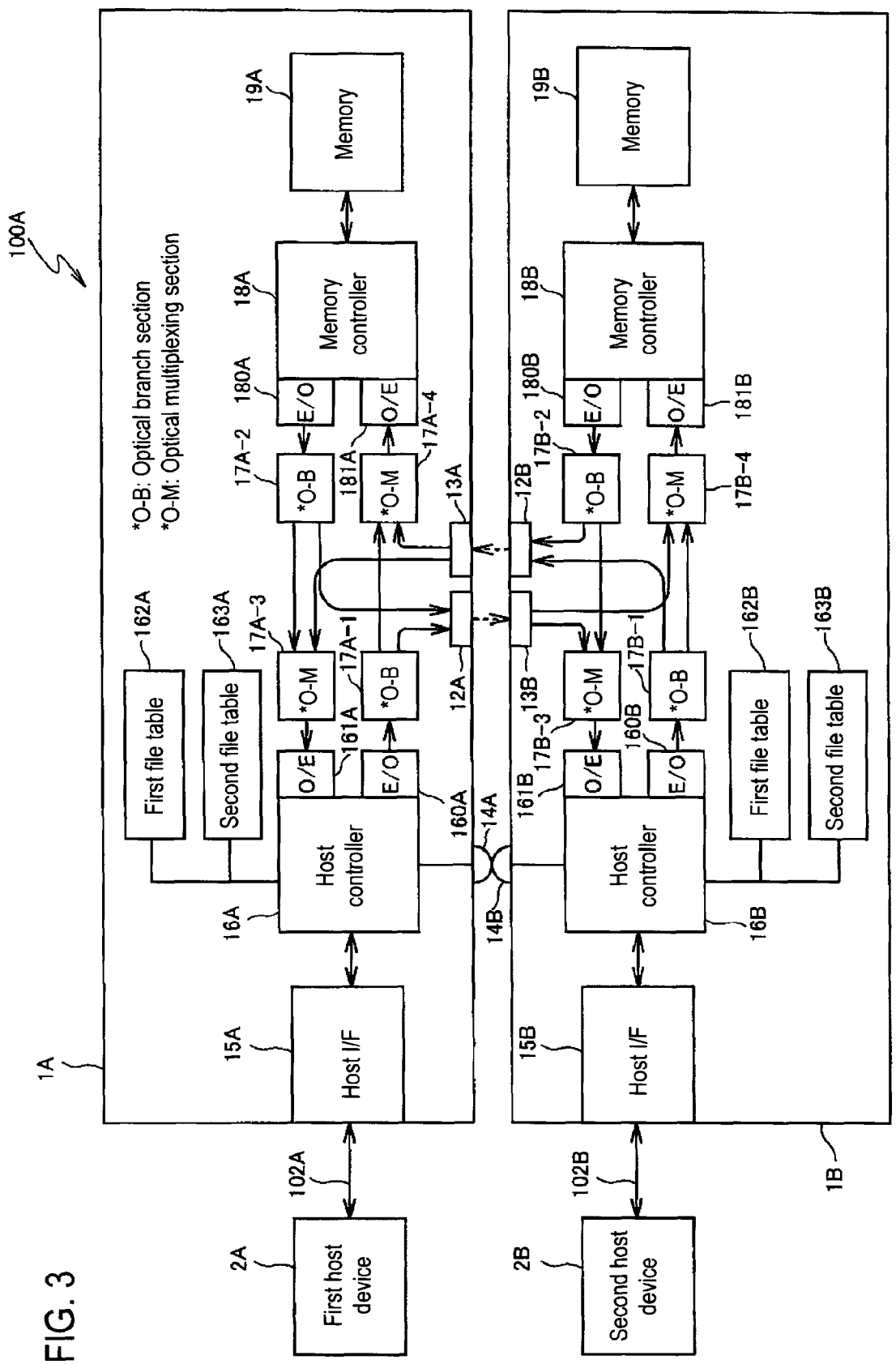
FIG. 3 is a block diagram showing an example of the schematic configuration of the data processing system according to the first exemplary embodiment of the invention.

FIG. 3 is a block diagram showing an example of the schematic configuration of the data processing system according to the first exemplary embodiment of the invention.

In addition to the optical transmission section 12A, the optical reception section 13A and the contact member 14A, the first storage device 1A includes a host interface (I/F) 15A, a host controller 16A, two optical branch sections 17A-1, 17A-2, two optical multiplexing sections 17A-3, 17A-4, a memory controller 18A, and a memory 19A.

In addition to the optical transmission section 12B, the optical reception section 13B and the contact member 14B, the second storage device 1B includes a host interface (I/F) 15B, a host controller 16B, two optical branch sections 17B-1, 17B-2, two optical multiplexing sections 17B-3, 17B-4, a memory controller 18B, and a memory 19B.

Namely, since the control system of the second storage device 1B is configured similarly to that of the first storage device 1A, the respective sections will be described with reference to the first storage device 1A. Further, the host I/Fs 15A and 15B are an example of first and second communication sections, the host controllers 16A, 16B are an example of second and fourth control sections, and the memory controllers 18A, 18B are an example of first and third control sections.

(Configuration of Respective Sections of Storage Device)

The host I/F 15A controls data transmission/reception between the first host device 2A and the host controller 16A.

The host controller 16A controls data transmission/reception among the host I/F 15A, the memory controller 18A, and the second storage device 1B.

The host controller 16A includes an E/O 160A (an example of a second electro-optical conversion section), an OE 161A (an example of second opto-electric conversion section), a file table 162A (an example of first management information) and a second file table 163B (an example of second management information). The E/O 160A converts an electric signal received from the host I/F 15A as data into an optical signal. The OE 161A converts optical signals transmitted from the second storage device 1B and the memory controller 18A into electric signals. The file table 162A manages data stored in the own memory 19A. The second file table 163B manages data stored in another storage device.

The first file table 162A stores information for each data stored in the own memory 19A, such as address at which the data is stored in the memory 19A, update time and date, and data size. Whenever the memory 19A is updated, the first file table 162A is updated according to the updated contents.

The second file table 163A stores information for each data stored in a memory 19B of the second storage device 1B, which is similar to the information stored in the first file table 162A. The host controller 16A compares the first file table 162A and the second file table 163A, thereby to determine as to whether or not there is any difference between the data stored in the storage devices 2A and 2B.

When the determination result indicates that there is a difference, the host controller 16A reads out the data corresponding to the difference from the memory 19A, transmits the read-out data to the second storage device 1B, and updates the second file table 163A based on the data corresponding to the difference. On the other hand, when there is no difference, the host controller 16A updates the second file table 163A based on the data received from the first host device 2A.

The first and second file tables 162A and 163A may be stored in any manner so long as the first and second file tables 162A and 163A are stored in a management information storage section that is accessible from the host controller 16A. The management information storage section may be provided at either of the inside or outside of the host controller 16A or may be provided in a partial storage area of the memory 19A. Further, in this exemplary embodiment, the first and second file tables 162A and 163A are configured so as to be accessible from the host controller 16A. However, the first and second file tables 162A and 163A may be configured so as to be accessible from the memory controller 18A, or so as to be accessible from both of the host controller 16A and the memory controller 18A.

When additional installation of the second storage device 1B is detected by the contact member 14A and the detection circuit, which function as a detection section, the host controller 16A brings the shutter 120A into the open state, and starts to transmit an optical signal from the optical transmission section 12A.

Also, when the second storage device 1B is additionally installed, the host controller 16A receives a connection request signal having a predetermined pattern, and authentication information for authentication from the second storage device 1B through the optical reception section 13A. When authenticating the second storage device 1B based on the authentication information, the host controller 16A permits to transmit and receive data to and from the second storage device 1B.

The predetermined pattern is formed by a combination of K characters in the 8B10B code. The connection request signal is such a signal that a clock can be extracted from its pattern. Authentication criterion information that is used as a criterion for determining as to whether or not another storage device is authenticated based on the authentication information is stored in, for example, a management area of the memory 19A. The host controller 16A determines, using the authentication criterion information, as to whether or not another storage device is authenticated based on the received authentication information.

After the second storage device 1B is authenticated, the host controller 16A exchanges device information mutually with the second storage device 1B, and determines time allocation so that a period in which the own host controller 16A and the memory controller 18A transmit data and a period in which the host controller 16B and the memory controller 18B of the second storage device 1B transmit data do not overlap with each other. The host controllers 16A, 16B and the memory controllers 18A, 18B transmit data based on the determined time allocation. Thereby, an optical signal for which time multiplexing has been performed is transmitted on an optical line.

The device information includes, for example, storage capacities of the memories 19A, 19B included in the storage devices 1A, 1B, processing speeds of the host controllers 16A, 16B, and the like.

The memory controller 18A controls writing and reading data into and from the memory 19A, based on the data transmitted from the host controller 16A.

Also, the memory controller 18A includes an E/O 180A (an example of a first electro-optical conversion section) and an OE 181A (an example of a first opto-electric conversion section). The E/O 180A converts an electric signal read-out from the memory 19A as data into an optical signal. The OE 181A converts optical signals transmitted from the host controller 16A and the second storage device 1B into electric signals.

Further, when the result of the comparing by the host controller 16A shows that there is no difference between the first file table 162A and the second file table 163A, the memory controller 18A transmits data received from the first host device 2A to the host controller 16A and to the second storage device 1B.

For data that are transmitted and received between the host controller 16A and the memory controller 18A, in order to bring a mark ratio (ratio of 0 to 1) of the transmission signal close to 50%, 8B/10B conversion technology that codes from 8-bit to 10-bit may be used.

The memory 19A is an example of a data storage section that stores data. Data is written and read from the memory 19A through the memory controller 18A. The memory 19A may be a volatile semiconductor memory such as DRAM, or a nonvolatile semiconductor memory such as a flash memory. Alternatively, the memory 19A may be a magnetic hard disc or an optical disc such as DVD.

Each of the optical branch sections 17A-1 and 17A-2 connected to the E/Os 160A and 180A has a function of branching one optical signal on an incident side into two optical signals on an outgoing side, and is formed of, for example, a sheet-shaped optical waveguide (optical sheet bus) or an optical coupler.

Each of the optical multiplexing sections 17A-3, 17A-4 connected to the O/E 161A, 181A is one in which the incident side of each optical branch section 17A-1, 17A-2 is replaced with the outgoing side thereof. Each optical multiplexing section multiplexes two optical signals on the incident side to output a multiplexed optical signal to the outgoing side. A transmission line that transmits the optical signal from the E/O 160A through the optical branch section 17A-1 to the memory controller 18A and the optical transmission section 12A constitutes an optical branching line. Also, a transmission line that transmits the optical signal from the E/O 180A through the optical branch section 17A-2 to the host controller 16A and the optical transmission section 12A constitutes an optical branching line.

Figure 4A:
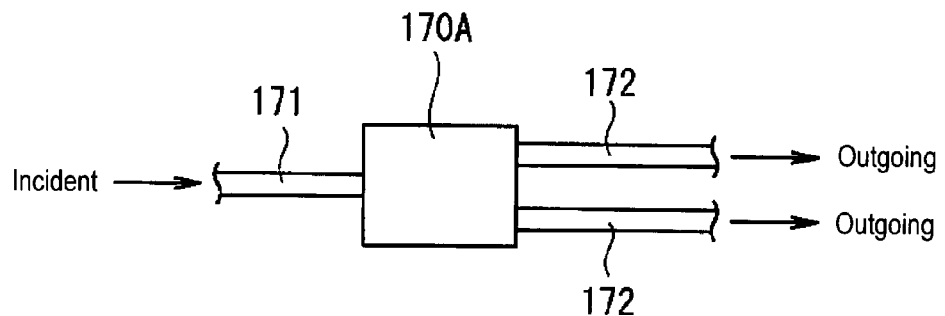
FIG. 4A is a section view of a sheet-shaped optical waveguide.
Figure 4B:
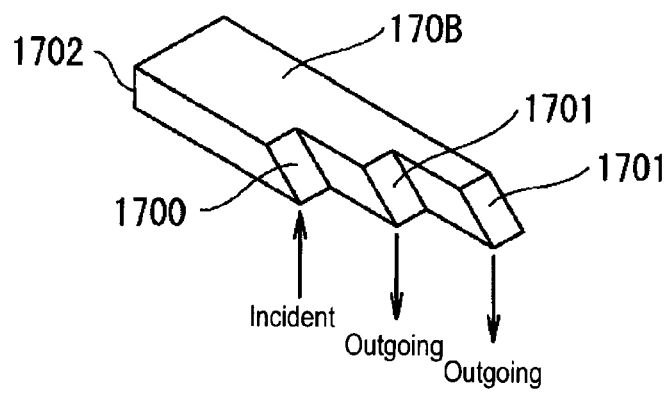
FIG. 4B is a perspective view of a sheet-shaped optical waveguide having the stepwise shape.
Figure 4C:
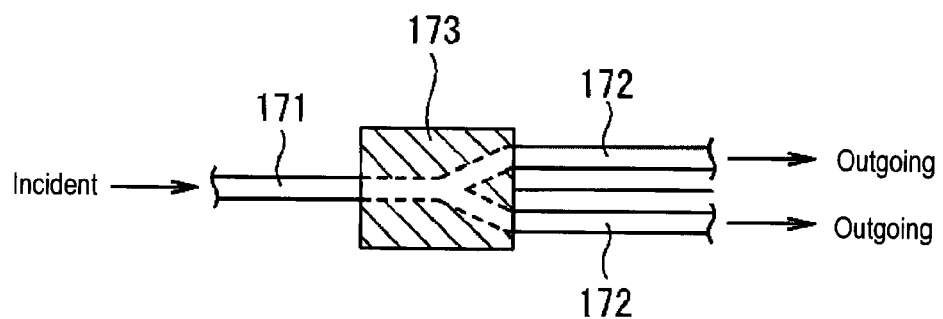
FIG. 4C is a section view of an optical coupler.

FIGS. 4A to 4C are diagrams showing configuration examples of the optical branch section. A sheet-shaped optical waveguide 170A shown in FIG. 4A is a sheet-shaped waveguide that diffuses uniformly light that enters through an optical fiber 171, and emits diffused light to two optical fibers 172. The sheet-shaped optical waveguide 170A is formed of a sheet-shaped transparent medium having uniform thickness, for example, plastic material such as polymethyl methacrylate, polycarbonate or amorphous polyolefin, or inorganic glass.

FIG. 4B shows a sheet-shaped optical waveguide 170B having a stepwise shape. The sheet-shaped optical waveguide 170B is formed of the similar material to that of the sheet shaped optical waveguide 170A. The sheet-shaped optical waveguide 170B diffuses uniformly light that enters from an incident surface 1700 having an angle of 45 degrees, reflects the incident light on a reflection surface 1702, and emits two light beams from outgoing surfaces 1701 each similarly having an angle of 45 degrees.

FIG. 4C shows an optical coupler 173. The optical coupler 173 is a waveguide having a Y-shaped core that branches light which enters through an optical fiber 171 into two light beams, and emits the branched light beams to two optical fibers 172.

(Operation of Data Processing System)

Next, an example of the operation of the data processing system according to the first exemplary embodiment of the invention will be described with reference to FIGS. 5 to 10 and in accordance with a flowchart of FIG. 8. In the flowchart of FIG. 8, steps S1 to S11 will be referred to as an authentication phase 110, steps S20 to S24 will be referred to as a synchronous phase 111, and steps S30 to S32 will be referred to as a standby phase 112. It is assumed that the second host device 2B and the second storage device 1B are additionally installed in a state where the first host device 2A and the first storage device 1A operate with being housed in the rack 101. The operation of each phase in this case will be described below. Also, in FIGS. 5 to 7 and FIGS. 10A and 10B, the host I/Fs 15A, 15B and the memories 19A, 19B are omitted.

(Authentication Phase)

First, when the second storage device 1B is arranged in the predetermined position in the rack 101 and power is applied, the contact member 14B comes into contact with the contact member 14A provided in the first storage device 1A, and the detection circuit of the second storage device 1B detects this contact (FIG. 8: S1)

On the other hand, also in the first storage device 1A, similarly the contact member 14A comes into contact with the contact member 14B of the second storage device 1B, and the detection circuit of the first storage device 1A detects this contact (S2).

When the detection circuit detects the contact, the host controller 16B of the second storage device 1B converts a connection request signal having a specified pattern into an optical signal by the E/O 160B, and transmits the optical signal obtained by this conversion through the optical branch section 17B-1 and the optical transmission section 12B to the first storage device 1A (S3). At this time, upon reception of an instruction from the host controller 16B, the shutter 120B is brought into the open state from the close state.

When receiving the optical signal transmitted from the second storage device 1B through the optical reception section 13A and the optical multiplexing sections 17A-3, the host controller 16A of the first storage device 1A converts the received optical signal into an electric signal by the O/E 161A, and extracts a clock from the electric signal obtained by this conversion (S4).

Next, when confirming that the pattern of the connection request signal is included in the electric signal, the host controller 16A converts an authentication information request signal having a particular pattern different from the pattern of the connection request signal into an optical signal by the E/O 160A, and transmits the optical signal obtained by this conversion to the second storage device 1B (S5). At this time, upon reception of an instruction from the host controller 16A, the shutter 120A is brought into the open state from the close state.

Next, upon reception of the transmitted optical signal, the host controller 16B of the second storage device 1B extracts a clock from an electric signal obtained through conversion by the O/E 161B (S6). Next, when confirming that the pattern of the authentication information request signal is included in the electric signal, the host controller 16B transmits its own authentication information to the first storage device 1A (S7).

Next, upon reception of its authentication information, the host controller 16A of the first storage device 1A determines as to whether or not authenticating the second storage device 1B based on the authentication information (S8). If the host controller 16A determines that authentication of the second storage device 1B is established, the host controller 16A permits the connection of the second storage device 1B to the own host controller 16A, and transmits its own device information to the second storage device 1B (S9). If the host controller 16A does not determine that authentication of the second storage device 1B is established, the host controller 16A does not permit the connection of the second storage device 1B to the won host controller 16A and does not perform data transmission between the second storage device 1B and the first storage device 1A.

Next, upon reception of the device information from the first storage device 1A, the host controller 16B of the second storage device 1B transmits its own device information and the first file table 162B to the first storage device 1A (S10).

The host controller 16A of the first storage device 1A updates its own second file table 163A based on the received first file table 162B. Also, the host controller 16A determines time allocation based on the received device information, and transmits the thus determined time allocation to its own memory controller 18A, the host controller 16B of the second storage device 1B, and the memory controller 18B of the second storage device 1B (S11).

As described above, the authentication is established between the first and second storage devices 1A and 1B, and the time allocation is determined. Thereby, the authentication phase is completed. Next, the respective controllers of the first and second storage devices 1A and 1B start data transmission/reception in accordance with the determined time allocation, and the procedure proceeds to the synchronous phase 111. As a result of this authentication phase 110, the first storage device 1A operates as a current system, and the additionally installed second storage device 1B operates as a standby system.

Figure 5:
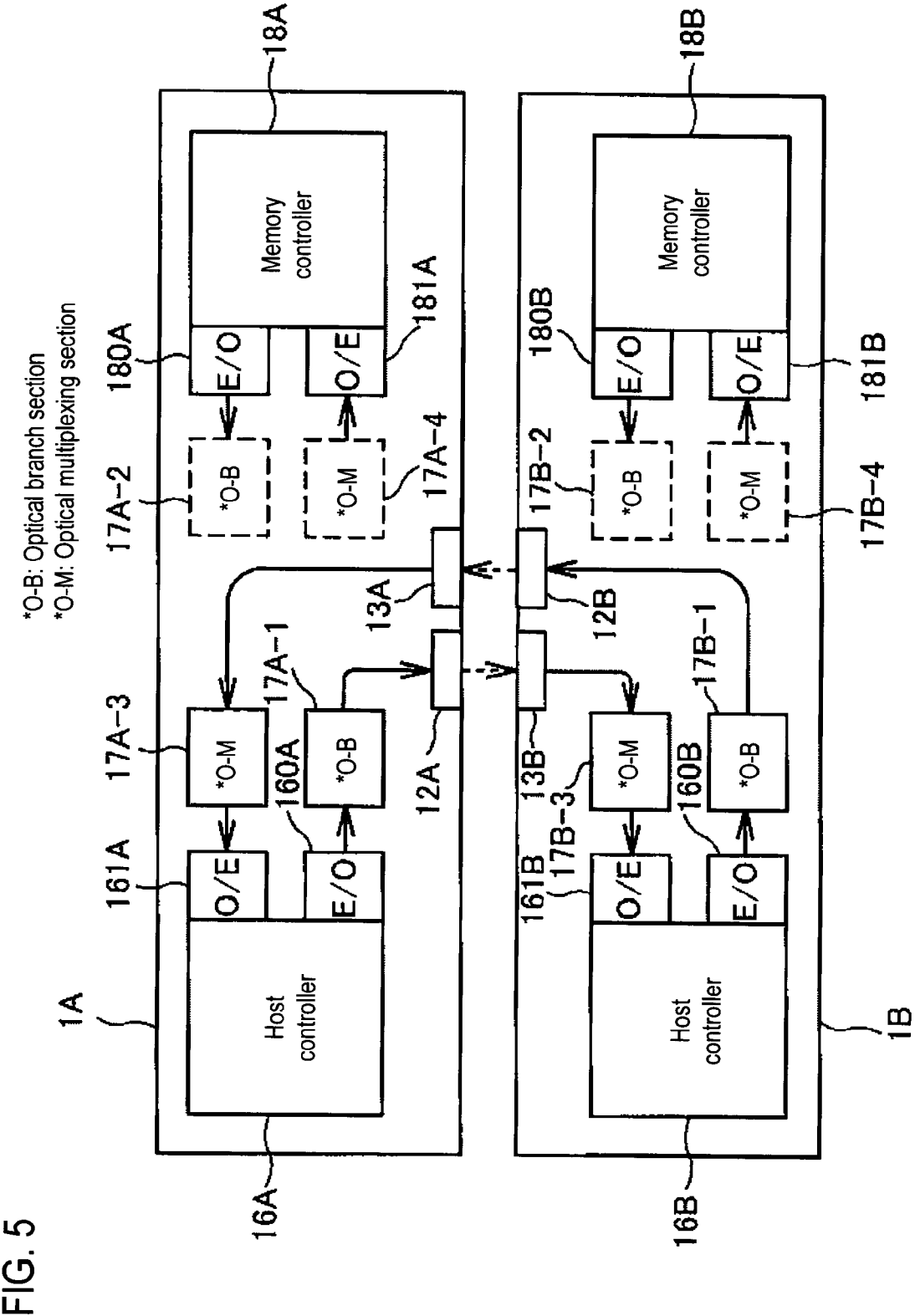
FIG. 5 is a diagram showing an example of transmission of optical signals in an authentication phase.

FIG. 5 is a diagram showing an example of transmission of an optical signal in the authentication phase 110. In the authentication phase 110, optical signals indicating the connection request signal, the authentication information request signal, the authentication information, and the device information are transmitted and received between the host controller 16A of the first storage device 1A and the host controller 16B of the second storage device 1B. Namely, the host controller 16B of the second storage device 1B receives the optical signals transmitted from the host controller 16A of the first storage device 1A, through the optical branch section 17A-1, the optical transmission section 12A, the optical reception section 13B and the optical multiplexing section 17B-3. Also, the host controller 16A of the first storage device 1A receives the optical signals transmitted from the host controller 16B of the second storage device 1B, through the optical branch section 17B-1, the optical transmission section 12B, the optical reception section 13A and the optical multiplexing section 17A-3.

(Synchronous Phase)

Next, in the authentication phase, the host controller 16A of the first storage device 1A compares the first file table 162A with the second file table 163A, which is updated based on the first file table 162B of the second storage device 1B, to thereby confirm consistency indicating as to whether or not there is a difference between the data stored in the first storage device 1A and the data stored in the second storage device 1B (FIG. 8: S20).

If the host controller 16A determines that the consistency is not ensured, the host controller 16A transmits to the memory controller 18A a transmission command signal for transmitting differential data. The differential data herein is data that is stored in the first storage device 1A but not stored in the second storage device 1B.

Upon reception of the transmission command signal, the memory controller 18A reads out the differential data from the memory 19A, and transmits the read-out differential data to the second storage device 1B (S21).

Upon reception of the differential data, the memory controller 18B of the second storage device 1B writes the differential data in its own memory 19B. Upon completion of the writing, the memory controller 18B transmits a data update completion signal to the first storage device 1A (S22).

Upon reception of the data update completion signal, the host controller 16A transmits a synchronous completion signal to the second storage device 1B (S23). Then, upon reception of the synchronous completion signal, the second storage device 1B moves to the standby phase (S24).

(Detailed Operation of Synchronous Phase)

Next, the detailed operation in the synchronous phase 111 will be described with reference to FIG. 6 and in accordance with a flowchart of FIG. 9.

Figure 9:
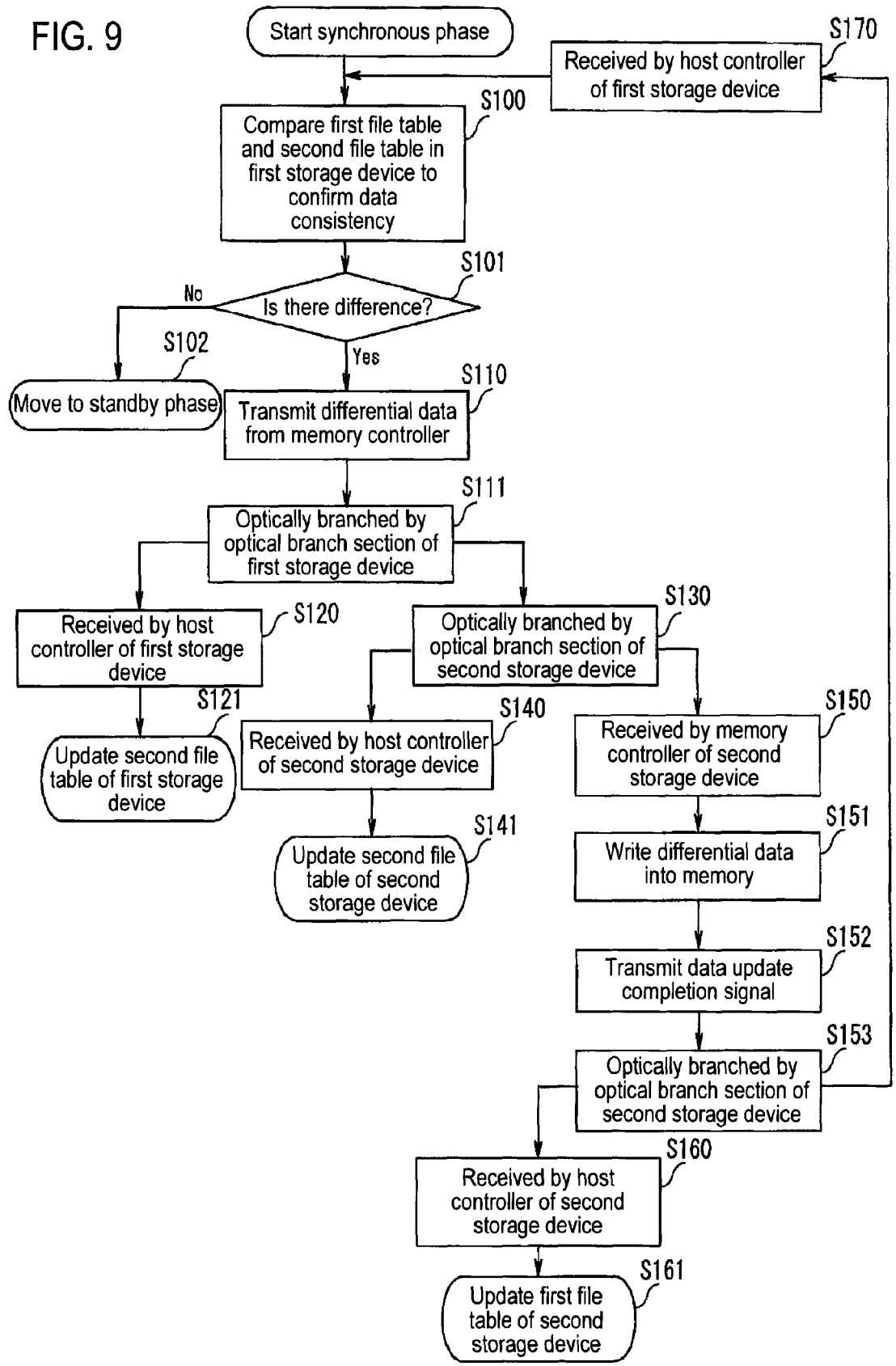
FIG. 9 is a flowchart showing an example of the detailed operation of the data processing system in a synchronous phase.

First, as described above, the host controller 16A of the first storage device 1A compares the first and the second file tables 162A, 163A, and confirms the consistency between data in those tables 162A, 163A (FIG. 9: S100).

If the comparison result shows that the data consistency is ensured and there is no differential data (S101: No), the first storage device 1A proceeds to the standby phase 112 (S102). On the other hand, if there is differential data (S101: Yes), the memory controller 18A of the first storage device 1A transmits, through the E/O 180A, the differential data read out from the memory 19A as an optical signal (S110).

Figure 6A:
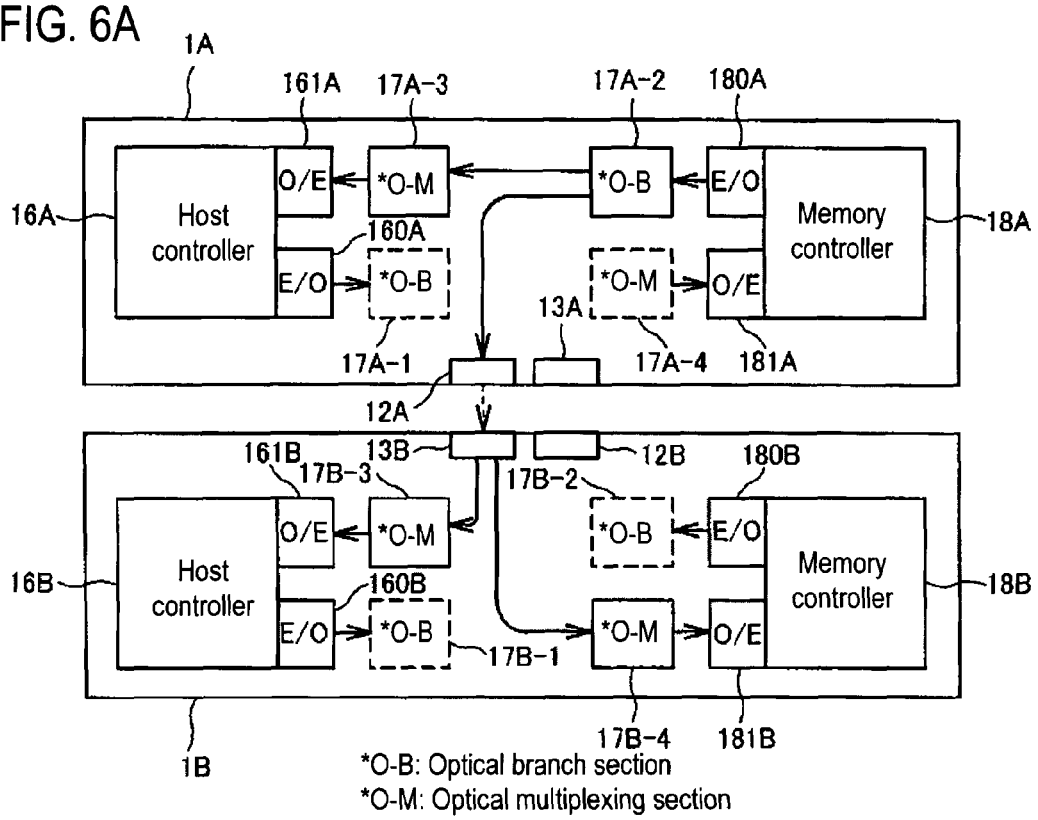
FIG. 6A is a diagram showing an example of section of an optical signal that is transmitted as differential data.

FIG. 6A is a diagram showing an example of transmission of the optical signal, which is transmitted as the differential data in the step S110. The optical signal, which is transmitted from the memory controller 18A of the first storage device 1A as the differential data, is branched by the optical branch section 17A-2 into two direction of the own host controller 16A and the optical transmission section 12A (S111).

Next, upon reception of one of the branched optical signals (S120), the host controller 16A stores management information relating to the differential data corresponding to the optical signal in the second file table 163A (S121).

Further, the optical signal, which is branched and transmitted to the optical transmission section 12A, is further branched by the optical reception section 13B of the second storage device 1B into two directions of the host controller 16B of the second storage device 1B and the memory controller 18B of the second storage device 1B (S130).

Upon reception of one of the optical signals branched by the optical reception section 13B through the optical multiplexing section 17B-3 (S140), the host controller 16B stores management information relating to the differential data corresponding to the received optical signal in the second file table 163B (S141).

Further, upon reception of the other of the optical signals branched by the optical reception section 13B (S150), the memory controller 18B writes data in the memory 19B based on the received optical signal (S151).

Next, upon completion of the data writing, the memory controller 18B transmits the data update completion signal through the E/O 180B as an optical signal (S152).

Figure 6B:
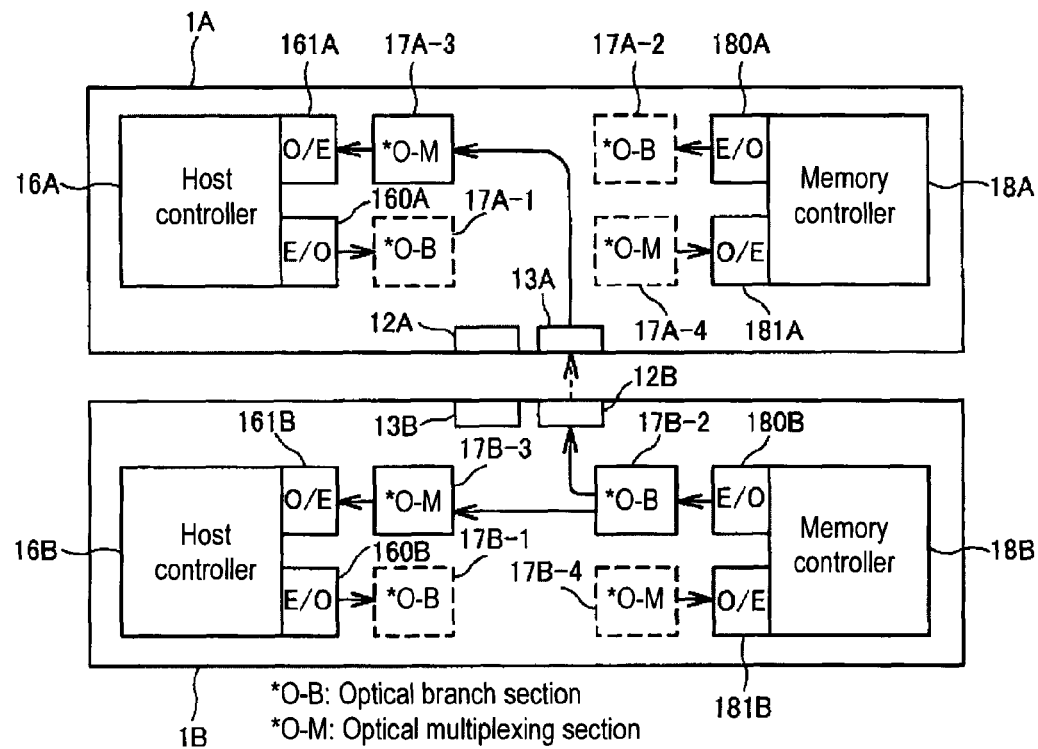
FIG. 6B is a diagram showing an example of transmission of an optical signal that is transmitted as a data update completion signal.

FIG. 6B is a diagram showing an example of transmission of the optical signal, which is transmitted as the data update completion signal in the step S152. The optical signal transmitted as the data update completion signal is branched by the optical branch section 17B-2 into two directions of the own host controller 16B and the optical transmission section 12B (S153).

Next, upon reception of one of the optical signals branched by the optical branch section 17B-2 (S160) through the optical multiplexing section 17B-3, the host controller 16B stores data information corresponding to the received optical signal in the first file table 162B (S161).

Also, the host controller 16A of the first storage device 1A receives the other of the optical signals branched by the optical branch section 17B-2 through the optical reception section 13A and the optical multiplexing section 17A-3 (S170). Next, the host controller 16A returns to the step S100, and confirms again as to whether or not any difference has been produced between the file tables during a period in which a series of the above operations are performed (S100). The reason why a difference is produced between the file tables is that: new writing data is transmitted from the first host device 2A even during a period in which the differential data is transmitted, and then the host controller 16A updates the first file table 162A corresponding to the writing data.

By thus repeating the transmission cycle of differential data, the data stored in the first storage device 1A and the data stored in the second storage device 1B coincide with each other. Thereby, the synchronous phase 111 is completed, and the procedure proceeds to the standby phase 112.

(Standby Phase)

Next, If a data writing request is given from the first host device 2A to the first storage device 1A after the procedure has proceeded to the standby phase 112, the host controller 16A of the first storage device 1A converts the data to be written into an optical signal by the E/O 160A and transmits the optical signal obtained by this conversion (FIG. 8: S30). At this time, the host controller 16A updates the first and second file tables 162A and 163A.

Figure 7:
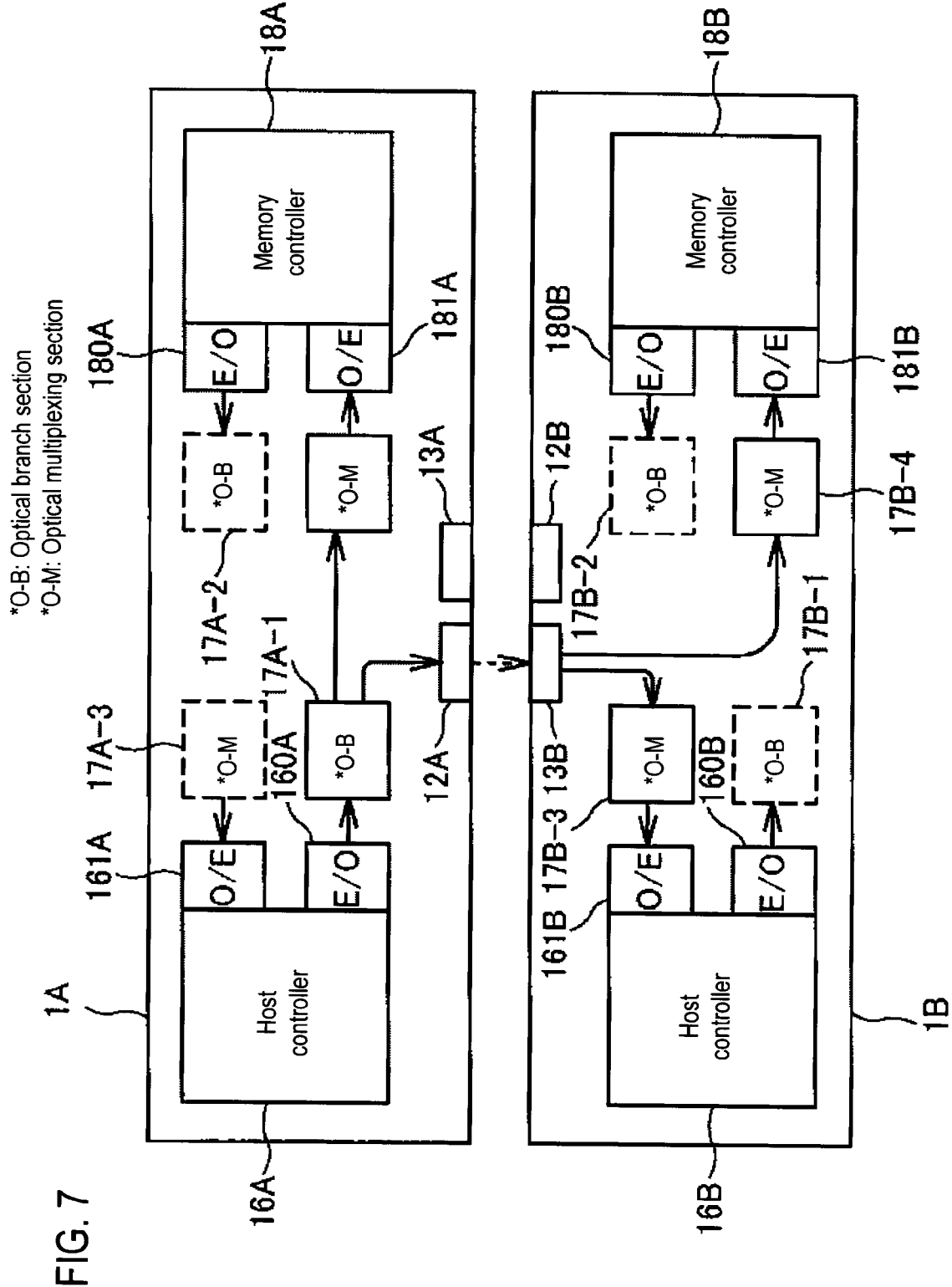
FIG. 7 is a diagram showing an example of transmission of an optical signal in a standby phase.
Figure 8:
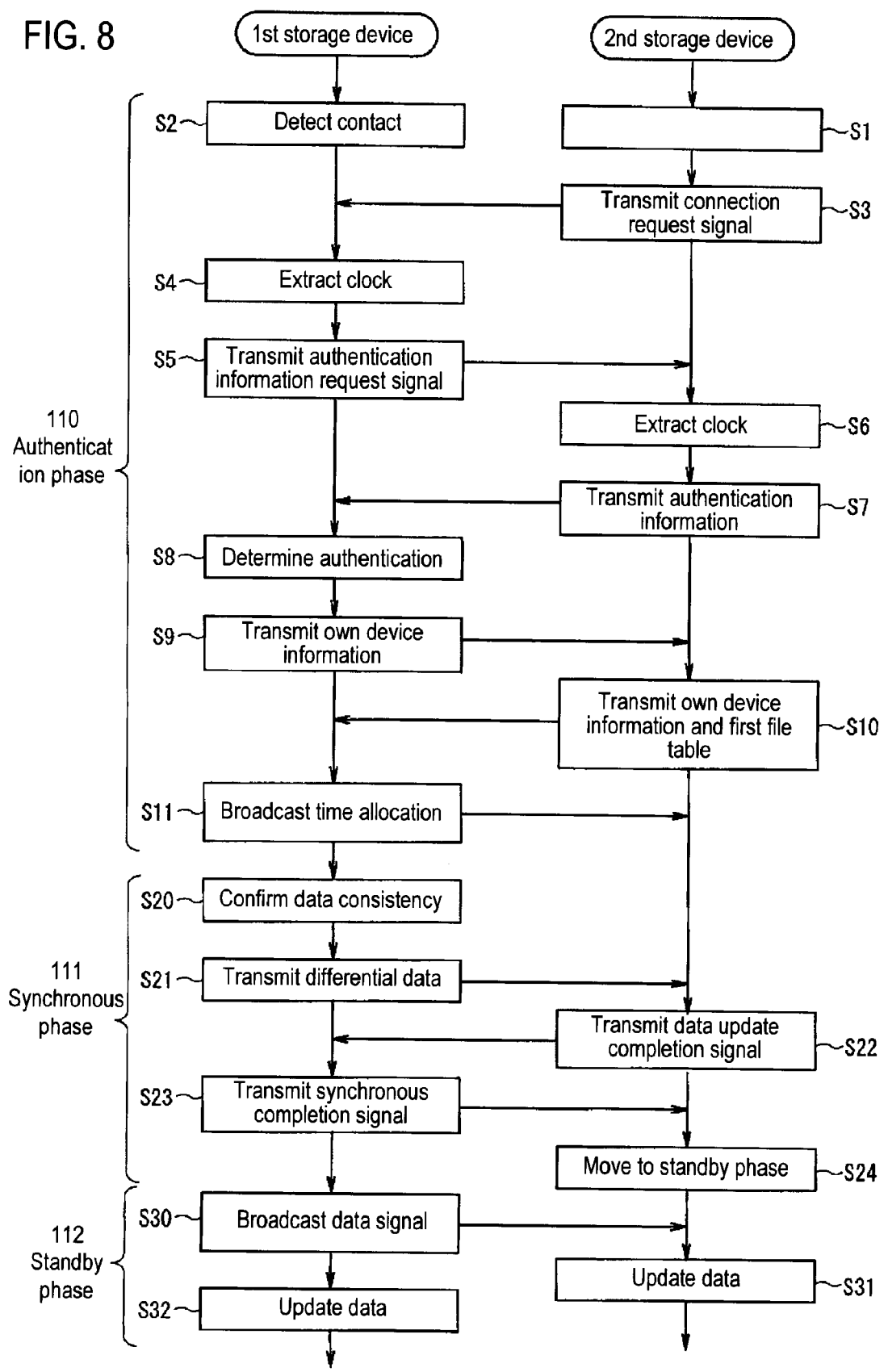
FIG. 8 is a flowchart showing an example of the operation of the data processing system according to the first exemplary embodiment of the invention.

FIG. 7 is a diagram showing an example of transmission of an optical signal in the standby phase. In the above step S30, the optical signal, which is transmitted from the host controller 16A of the first storage device 1A as the data to be written, is transmitted through the optical branch section 17A-1 to two directions of the own memory controller 18A and the optical transmission section 12A. Then, the optical signal, which is transmitted to the optical transmission section 12A, is transmitted through the optical reception section 13B to two directions of the host controller 16B of the second storage device 1B and the memory controller 18B.

In the first storage device 1A, the memory controller 18A receives one of the optical signals branched by the optical branch section 17A-1, and writes the data to be written in the memory 19A (S31).

In the second storage device 1B, the memory controller 18B receives one of the optical signals branched by the optical reception section 13B, and writes the data to be written in the memory 19B (S32). Also, the memory controller 18B receives the other of the optical signals branched by the optical reception section 13B, and updates the first and second file tables 162B and 163B.

Also, in the standby phase, if a failure occurs in the first host device 2A or the first storage device 1A, take-over processing (fail-over) in which the second host device 2B takes over service that the first host device 2A provides is executed so that the current system is changed to a failure system. After the execution of the take-over processing, the second host device 2B starts the service, and the second host device 2B and the second storage device 1B operate as the current system.

Further, in the standby phase 112, the first and second storage devices 1A and 1B transmit link hold signals having specified patterns from their respective host controllers 16A and 16B periodically. If the host controllers 16A and 16B do not receive the link hold signals for a certain period, each of the first and second storage devices 1A and 1B recognizes that the counterpart storage device has been removed or a failure has occurred in transmission/reception of the optical signal, and stops the transmission of the optical signal.

(Data Flow Between Storage Devices)

Next, flow of data transmitted/received in the data processing system 100A will be described with reference to FIGS. 10A and 10B.

Figure 10A:
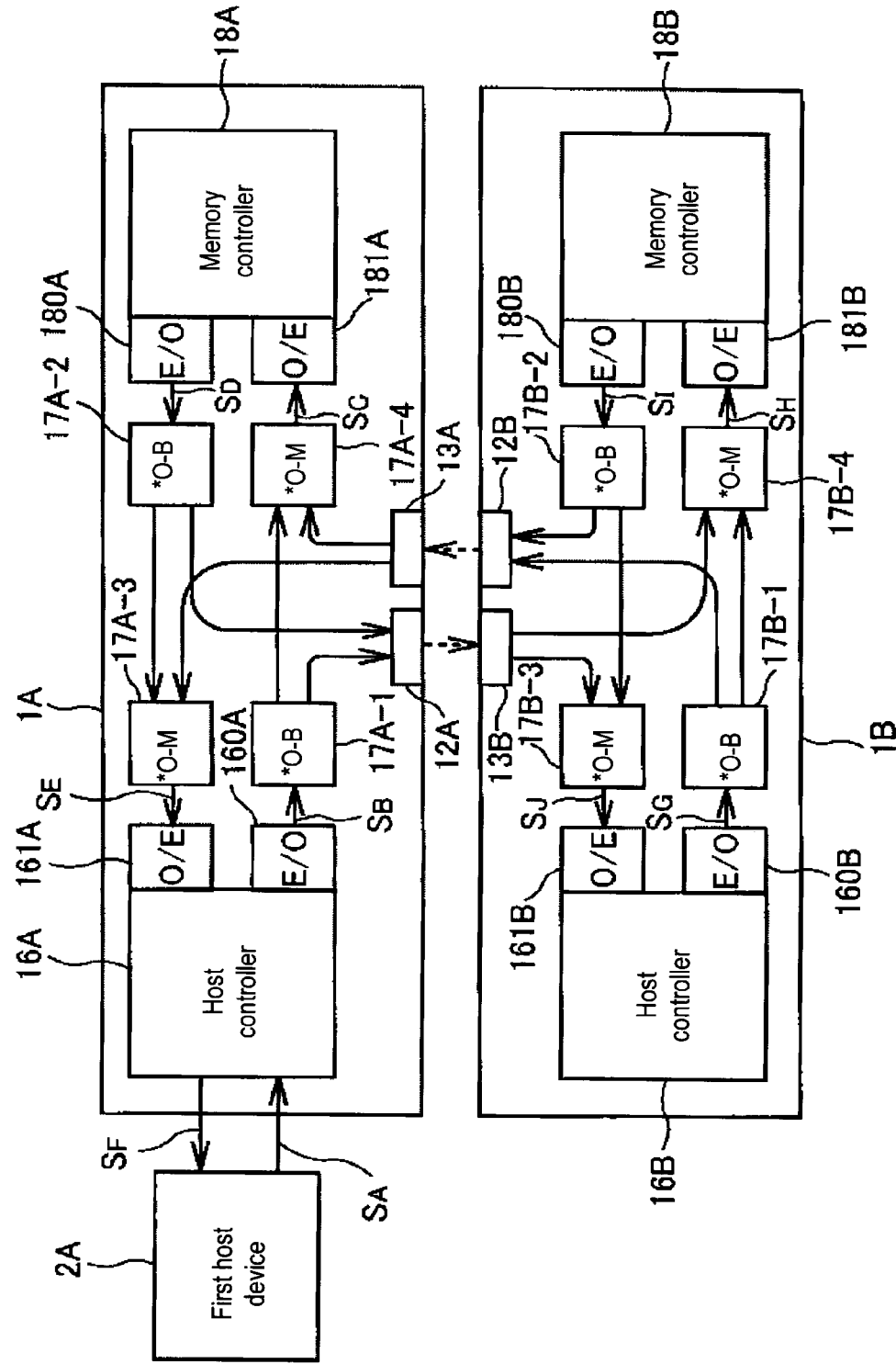
FIG. 10A is a diagram showing data signals flowing in respective sections in first and second storage devices.
Figure 10B:
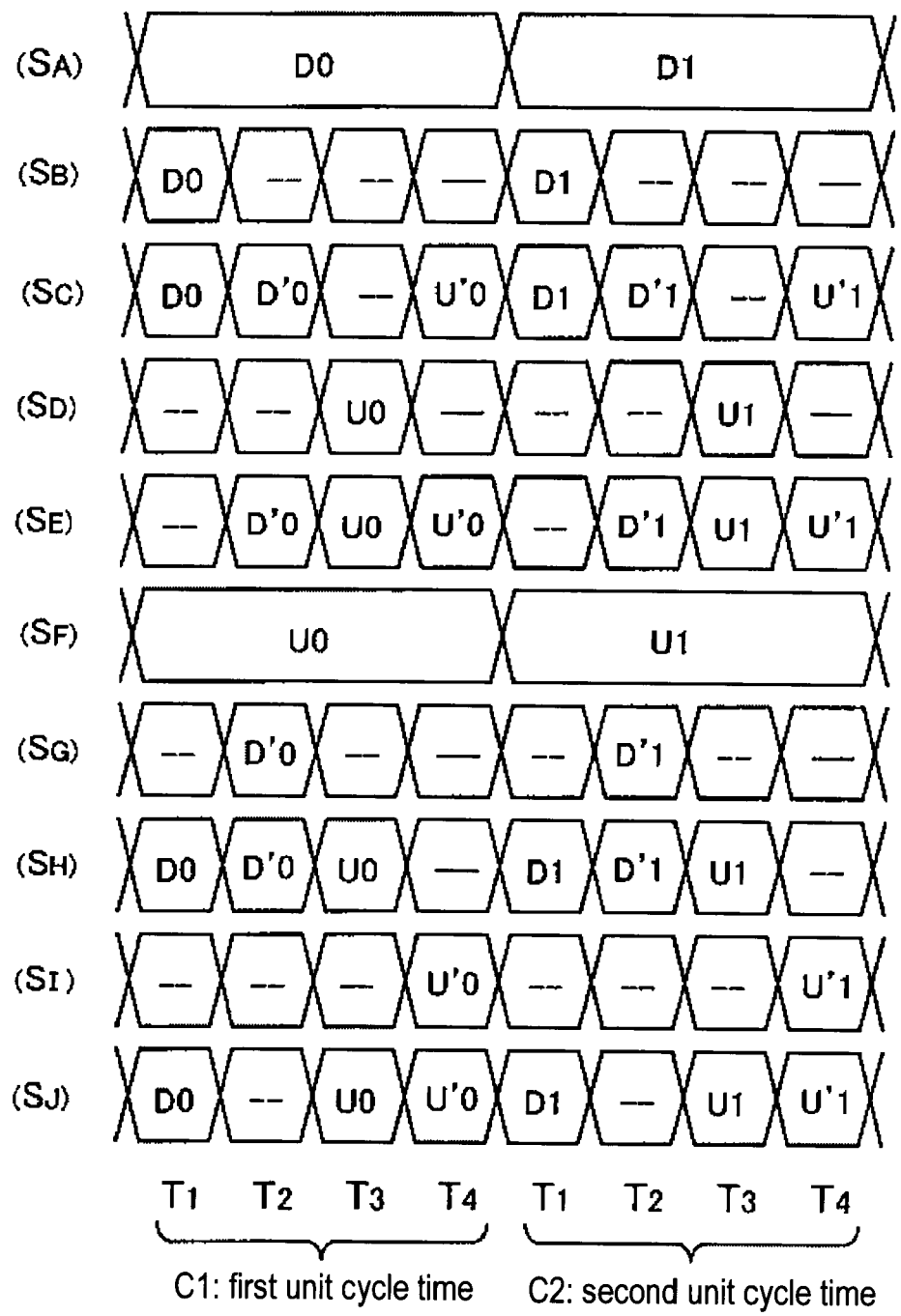
FIG. 10B is a diagram showing an example of data assigned to each unit cycle time of the data signals.

FIG. 10A is a diagram showing data signals $S_A$ to $S_J$ flowing in the respective section of the first and second storage device 1A and 1B. FIG. 10B is a diagram showing an example of data assigned to each unit cycle time of the data signals $S_A$ to $S_J$. In FIGS. 10A and 10B, internal transmission frequency of the first and second storage devices 1A and 1B is four times as large as transmission frequency between the first host device 2A and the first storage device 1A. For example, the data transmission is performed at transmission frequency of 2.5 Gbps between the first host device 2A and the first storage device 1A; and the data transmission is performed at transmission frequency of 10 Gbps, which is four times as large as 2.5 Gbps, inside each of the first and second storage devices 1A and 1B. Therefore, if certain data can be transmitted in the unit cycle time of 2.5 Gbps, the certain data can be transmitted in one-fourth cycle time in the 10 Gbps data transmission of.

Here, it is assumed that segment cycle times obtained by dividing each of the unit cycle times C1 and C2 between the first host device 2A and the first storage device 1A into four are referred to as T1, T2, T3 and T4. It is further assumed that, in the first storage device 1A, a data signal $S_A$ transmitted in a downstream direction includes data D0 and data D1, and that a data signal $S_D$ transmitted in an upstream direction includes data U0 and data U1. Furthermore, it is assumed that, in the second storage device 1B, a data signal $S_G$ transmitted in the downstream direction includes data D'0 and data D'1 and that a data signal $S_J$ transmitted in the upstream direction includes data U'0 and data U'1.

These data signals are packeted, which are signals including, for example, data to be written, data to be read, and data such as header and footer. The header and the footer include command information indicating a type of a packet, address information of a destination into which data is to be written, an error correction code, and the like.

In the first unit cycle time C1, the host controller 16A of the first storage device 1A assigns the data D0 to the segment cycle time T1 based on the time allocation determined in the authentication phase 110, and transmits a data signal $S_B$. Also, the memory controller 18A assigns the data U0 to the segment cycle time T3, and transmits a data signal $S_D$.

The host controller 16B of the second storage device 1B assigns the data D'0 to the segment cycle time T2, and transmits a data signal $S_G$. Also, the memory controller 18B assigns the data U'0 to the segment cycle time T4, and transmits a data signal $S_I$.

Also, the memory controller 18A of the first storage device 1A as the reception side of the optical signal receives a data signal $S_C$ in which data D0, D'0 and U'0 are assigned to the segment cycle times T1, T2 and T4, respectively. Further, the host controller 16A receives a data signal $S_E$ in which the data D'0, U0 and U'0 are assigned to the segment cycle times T2, T3 and T4, respectively.

The memory controller 18B of the second storage device 1B as the reception side of the optical signal receives a data signal $S_H$ in which the data D0, D'0 and U0 are assigned to the segment cycle times T1, T2 and T3, respectively. Further, the host controller 16B receives a data signal $S_J$ in which the data D0, U0 and U'0 are assigned to the segment cycle times T1, T3 and T4, respectively.

Each of the host controllers 16A, 16B and the memory controllers 18A, 18B, which have received the data signals, respectively, analyzes header and footer included in the received data signal, and perform processing based on the analysis result.

Also, in the second unit cycle time C2, object data D0, D'0, U0 and U'0 are only replaced by D1, D'1, U1 and U'1, and a data assigning method based on the time allocation is similar to that in the first unit cycle time C1.

The above data transmission is performed in the standby phase 112. In the synchronous phase 111, one-way data transmission from the first storage device 1A to the second storage device 1B is performed. Therefore, in the synchronous phase 111, by assigning the segment cycle times T3 and T4 to transmission of differential data, the transmission band between the storage devices doubles as compared with the transmission band in the standby phase.

(Modified Example of Optical Transmission/Reception Section)

Next, a modified example of the structure in which an optical signal is transmitted between the optical transmission section and the optical reception section will be described with reference to FIG. 11.

Figure 11A:
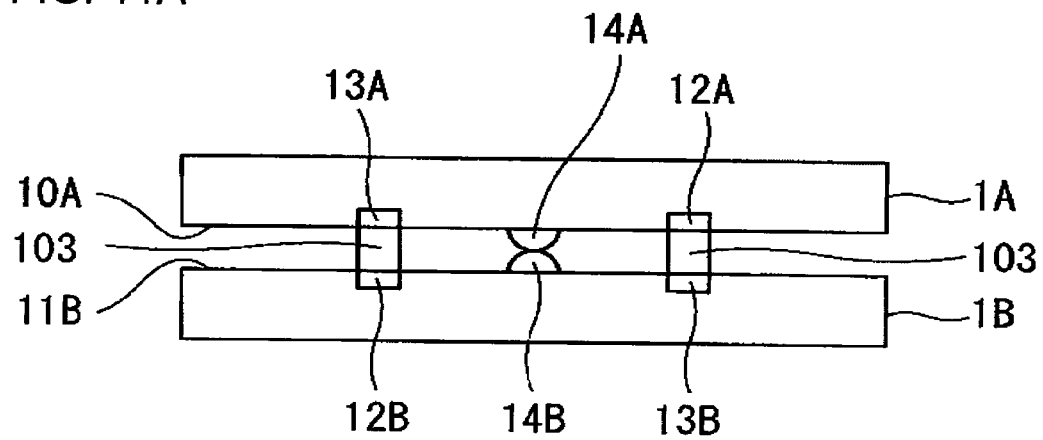
FIG. 11A is a section view of the storage devices in the case where a light guide member is provided between an optical transmission section and an optical reception section.

In FIG. 11A, a light guide member 103 such as an optical fiber is provided between the optical transmission section 12A and the optical reception section 13B, and when the positions of the first and second storage devices 1A and 1B are overlapped, the optical transmission section 12A and the optical reception section 13B are connected by the light guide member 103. Also, the light guide member 103 is provided between the optical transmission section 12B and the optical reception section 13A.

Figure 11B:
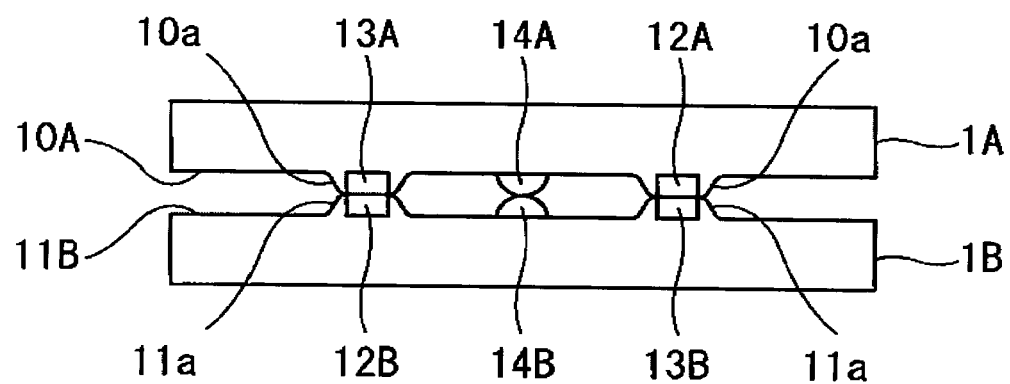
FIG. 11B is a section view of the storage devices in the case where the optical transmission section and the optical reception section are provided in protrusion portions.

FIG. 11B is a diagram showing that the optical transmission sections 12A, 12B and the optical reception sections 13A, 13B are arranged in protrusion portions provided on the lower surface 10A and the upper surface 11B. Namely, protrusion portions 10a protruding toward the upper surface 11B are provided on the lower surface 10A of the first storage device 1A. In the protrusion portions 10a, the optical transmission section 12A and the optical reception section 13A are arranged. Also, protrusion portions 11a protruding toward the lower surface 10A are provided on the upper surface 11B of the second storage device 1B. In the protrusion portions 11a, the optical transmission section 12B and the optical reception section 13B are arranged. Thereby, the optical transmission section and the optical reception section opposing to the optical transmission section are directly connected, or a distance therebetween is shortened.

Second Exemplary Embodiment

Figure 12:
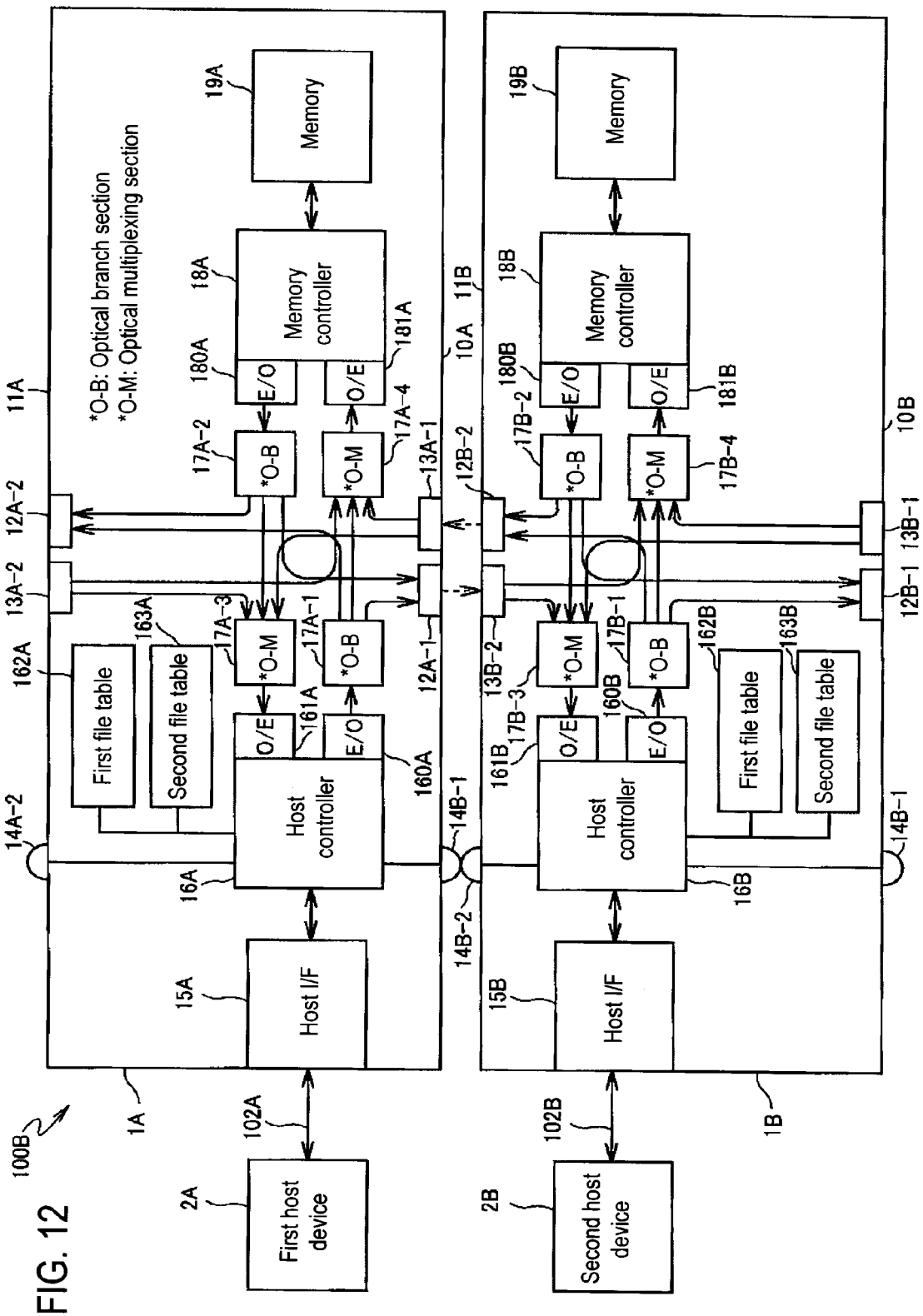
FIG. 12 is a block diagram showing an example of the schematic configuration of a data processing system according to a second exemplary embodiment of the invention.

FIG. 12 is a block diagram showing an example of the schematic configuration of a data processing system according to a second exemplary embodiment of the invention.

In the data processing system 100A according to the first exemplary embodiment of the invention, the optical transmission sections, the optical reception sections, and the contact members are provided on the lower surface 10A of the first storage device 1A and the upper surface 11B of the second storage device 1B. To the contrary, in a data processing system 100B according to this exemplary embodiment, first and second storage devices 1A and 1B have optical transmission sections, optical reception sections, and contact members on both of the lower surfaces 10A, 10B and the upper surfaces 11A, 11B, respectively.

Namely, with reference to the first storage device 1A as an example, the first storage device 1A includes an optical transmission section 12A-2, an optical reception section 13A-2 and a contact member 14A-2 that are provided on the upper surface 11A thereof, and an optical transmission section 12A-1, an optical reception section 13A-1 and a contact member 14B-1 that are provided on the lower surface 10A therefore. In addition, the first storage device 1A includes a host interface (I/F) 15A, a host controller 16A, two optical branch sections 17A-1, 17A-2, two optical multiplexing sections 17A-3, 17A-4, a memory controller 18A, and a memory 19A. The second storage device 1B has the same configuration as that of the first storage device 1A.

Each of the optical branch sections 17A-1 and 17A-2 branches one optical signal on the incident side into three optical signals and outputs the three optical signals to the outgoing side. Also, each of the optical multiplexing sections 17A-3 and 17A-4 multiplexes three optical signals on the incident side and outputs one optical signal to the outgoing side.

In the above configuration, when the second storage device 1B is additionally installed on the lower surface 10A side of the first storage device 1A in a state where the first host device 2A and the first storage device 1A are operating, transmission/reception of optical signals is performed between the optical transmission section 12A-1 and the optical reception section 13A-1, which are provided on the lower surface 10A of the first storage device 1A, and the optical reception section 13B-2 and the optical transmission section 12B-2, which are provided on the upper surface 11B of the second storage device 1B, as shown in FIG. 12. On the other hand, when the second storage device 1B is additionally installed on the upper surface 11A side of the first storage device 1A, transmission/reception of optical signals is performed between the optical transmission section 12A-2 and the optical reception section 13A-2, which are provided on the upper surface 11A of the first storage device 1A, and the optical reception section 13B-1 and the optical transmission section 12B-1, which are provided on the lower surface 10B of the second storage device 1B.

Third Exemplary Embodiment

Figure 13:
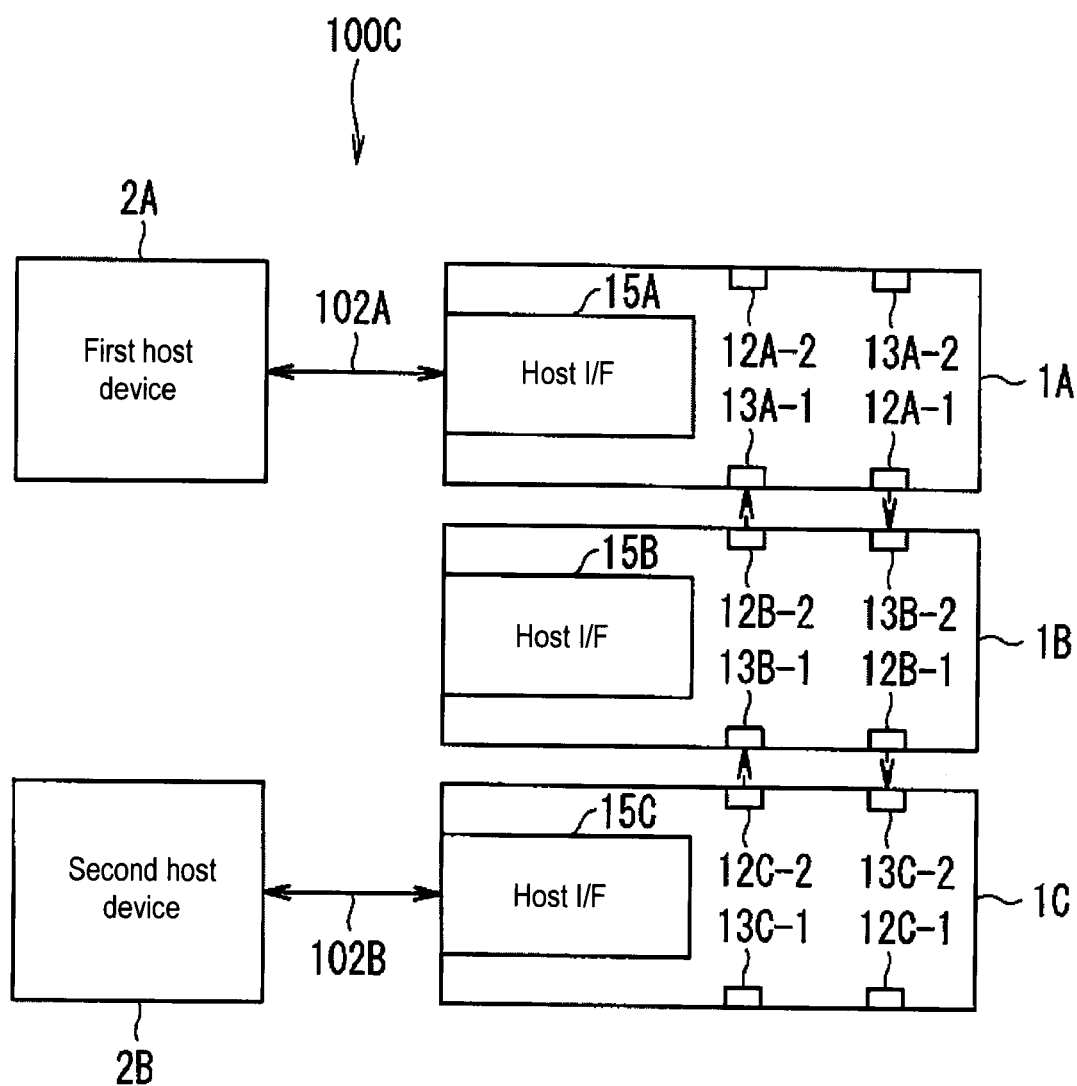
FIG. 13 is a block diagram showing an example of the schematic configuration of a data processing system according to a third exemplary embodiment of the invention.

FIG. 13 is a block diagram showing an example of the schematic configuration of a data processing system according to a third exemplary embodiment of the invention.

This data processing system 100C includes first to third storage devices 1A to 1C, and first and second host devices 2A and 2B. The first storage device 1A and the first host device 2A are connected to each other by a cable 102A, and the third storage device 1C and the second host device 2B are connected to each other by a cable 102B. Although the first to third storage devices 1A to 1C in the example of FIG. 13 are configured similarly to the storage devices according to the second exemplary embodiment, the first and third storage devices 1A and 1C may be configured similarly to the first and second storage devices 1A and 1B according to the first exemplary embodiment.

In the data processing system 100C shown in FIG. 13, although the three storage devices 1A to 1C are provided as a storage device array, the number of the storage devices is not limited to three, but may be four or more.

In this configuration, when the first host device 2A and the first storage device 1A are operating as a current system, the second and third storage devices 1B and 1C function as a backup device and store data similar to data stored in the first storage device 1A.

If a failure occurs in the current system, fail-over is performed, and the second host device 1B and the third storage device 1C operate as the current system. In this time, the second device 1B functions as the backup device and stores data similar to data stored in the third storage device 1C.

Other Exemplary Embodiments

The invention is not limited to the above-described exemplary embodiments, and various modifications may be made so long as the modification result does not depart from the gist of the invention. Furthermore, the respective components in the above exemplary embodiments may be arbitrarily combined together so long as the modification result does not depart from the gist of the invention.

Also, in the above exemplary embodiments, as the E/O (electro-optical conversion section), for example, a light emitting element such as a semiconductor laser or a light emitting diode may be utilized; and as the OE (opto-electric conversion section), a light receiving element such as a semiconductor photodiode may be utilized. Furthermore, the memory controller and the host controller may be implemented by, for example, an electric circuit including an integrated circuit such as EPGA.

What is claimed is:

1. A storage device comprising:
   a data storage section that stores data;
   a first control section that controls reading and writing the data from and into the data storage section;
   a communication section that is connected to a host device for processing data of the data storage section and for requesting the data storage section to read and write data;
   a second control section that transmits and receives the data to and from the first control section and the communication section;
   a wireless transmission/reception section that is directly connected to the first and second control sections respectively, is directed toward a predetermined direction, and wirelessly transmits and receives data to and from another storage device provided in the predetermined direction;
   the first control section including
      a first electro-optical conversion section that converts an electric signal as the data into an optical signal, and
      a first opto-electric conversion section that converts, into electric signals, optical signals that are transmitted from the second control section and the wireless transmission/reception section,
   the second control section including
      a second electro-optical conversion section that converts an electric signal as the data into an optical signal, and
      a second opto-electric conversion section that converts, into electric signals, optical signals that are transmitted from the first control section and the wireless transmission/reception section,
   a first transmission line that connects the first control section to the second control section and connects the first control section to the wireless transmission/reception section, the first transmission line being a first optical branching line including an optical branch section that branches the optical signal output by the first electro-optical conversion section into both directions to the second opto-electric conversion section of the second control section and to the wireless transmission/reception section;
   a second transmission line that connects the second control section to the first control section and connects the second control section to the wireless transmission/reception section, the second transmission line being a second optical branching line including an optical branch section that branches the optical signal output by the second electro-optical conversion section into both directions to the first opto-electric conversion section of the first control section and to the wireless transmission/reception section; and
   a housing including the data storage section, the first control section, the communication section, the second control section, the wireless transmission/reception section, the first transmission line, and the second transmission line.

2. The storage device according to claim 1, further comprising:
   a management information storage section that stores
      first management information relating to the data stored in the data storage section, and
      second management information relating to data stored in said another storage device.

3. The storage device according to claim 2, wherein when there is a difference between the first management information and the second management information stored in the management information storage section, the first control section reads out data corresponding to the difference from the data storage section and transmits the read-out data through the wireless transmission/reception section to said another storage device.

4. The storage device according to claim 3, wherein the first or second control section updates the second management information stored in the management information storage section, based on the data corresponding to the difference.

5. The storage device according to claim 2, wherein when there is no difference between the first management information and the second management information stored in the management information storage section, the second control section transmits the data received through the communication section from the host device to the first control section and transmits the received data through the wireless transmission/reception section to said another storage device.

6. The storage device according to claim 5, wherein the first or second control section updates the second management information stored in the management information storage section, based on the data received from the host device.

7. The storage device according to claim 1, further comprising
   a detection section that is arranged toward the predetermined direction and detects as to whether or not said another storage device is arranged in the predetermined direction, wherein
   during the detection section detecting that said another storage device is arranged in the predetermined direction, the second control section starts to transmit and receive data to and from said another storage device.

8. The storage device according to claim 1, wherein
   the second control section receives authentication information transmitted from said another storage device, and
   when said another storage device is authenticated based on the authentication information, the second control section permits to transmit and receive data to and from said another storage device.

9. The storage device according to claim 1, wherein
   the first control section transmits data during a period that is different from a period in which the first control section is to receive data from the second control section and said another storage device, and
   the second control section transmits data during a period that is different from a period in which the second control section is to receive data from the first control section and another storage device.

10. A storage device comprising:
    a data storage section that stores data;
    a first control section that controls reading and writing the data from and into the data storage section;
    a communication section that is connected to a host device for processing data of the data storage section and for requesting the data storage section to read and write data;

a second control section that transmits and receives the data to and from the first control section and the communication section;
a first wireless transmission/reception section that is directly connected to the first and second control sections respectively, is directed toward a predetermined direction, and wirelessly transmits and receives data to and from first another storage device provided in the predetermined direction;
a second wireless transmission/reception section that is directly connected to the first and second control sections respectively, is directed toward a direction opposite to the predetermined direction, and wirelessly transmits and receives data to and from second another storage device provided in the direction opposite to the predetermined direction;
the first control section including
a first electro-optical conversion section that converts an electric signal as the data into an optical signal, and
a first opto-electric conversion section that converts, into electric signals, optical signals that are transmitted from the second control section and the wireless transmission/reception section,
the second control section including
a second electro-optical conversion section that converts an electric signal as the data into an optical signal, and
a second opto-electric conversion section that converts, into electric signals, optical signals that are transmitted from the first control section and the wireless transmission/reception section,
a first transmission line that connects the first control section to the second control section and connects the first control section to the first wireless transmission/reception section and connects the first control section to the second wireless transmission/reception section, the first transmission line being a first optical branching line including an optical branch section that branches the optical signal output by the first electro-optical conversion section into three directions to the second opto-electric conversion section of the second control section and to the first and second wireless transmission/reception sections;
a second transmission line that connects the second control section to the first control section and connects the second control section to the first wireless transmission/reception section and connects the second control section to the second wireless transmission/reception section, the second transmission line being a second optical branching line including an optical branch section that branches the optical signal output by the second electro-optical conversion section into three directions to the first opto-electric conversion section of the first control section and to the first and second wireless transmission/reception sections; and
a housing including the data storage section, the first control section, the communication section, the second control section, the first wireless transmission/reception section, the second wireless transmission/reception section, the first transmission line, and the second transmission line.

11. A storage device array comprising:
a first storage device; and
a second storage device that is provided in a predetermined direction with respect to the first storage device, wherein
the first storage device includes
a first data storage section that stores data,
a first control section that controls reading and writing the data from and into the first data storage section,
a first communication section that is connected to a first host device for processing data of the first data storage section and for requesting the first data storage section to read and write data,
a second control section that transmits and receives the data to and from the first control section and the first communication section,
a first wireless transmission/reception section that is directly connected to the first and second control sections respectively, is directed toward the predetermined direction, and wirelessly transmits and receives data to and from the second storage device,
the first control section including
a first electro-optical conversion section that converts an electric signal as the data into an optical signal, and
a first opto-electric conversion section that converts, into electric signals, optical signals that are transmitted from the second control section and the first wireless transmission/reception section,
the second control section including
a second electro-optical conversion section that converts an electric signal as the data into an optical signal, and
a second opto-electric conversion section that converts, into electric signals, optical signals that are transmitted from the first control section and the first wireless transmission/reception section,
a first transmission line that connects the first control section to the second control section and connects the first control section to the first wireless transmission/reception section, the first transmission line being a first optical branching line including an optical branch section that branches the optical signal output by the first electro-optical conversion section into both directions to the second opto-electric conversion section of the second control section and to the first wireless transmission/reception section,
a second transmission line that connects the second control section to the first control section and connects the second control section to the first wireless transmission/reception section, the second transmission line being a second optical branching line including an optical branch section that branches the optical signal output by the second electro-optical conversion section into both directions to the first opto-electric conversion section of the first control section and to the first wireless transmission/reception section, and
a housing including the first data storage section, the first control section, the first communication section, the second control section, the first wireless transmission/reception section, the first transmission line, and the second transmission line, and
the second storage device includes
a second data storage section that stores data,
a third control section that controls reading and writing the data from and into the second data storage section,
a second communication section that is connected to a second host device for processing data of the second data storage section and for requesting the second data storage section to read and write data,
a fourth control section that transmits and receives the data to and from the third control section and the second communication section, and
a second wireless transmission/reception section that is directly connected to the third and fourth control sections respectively, is directed toward a direction of the first storage device, and wirelessly transmits and receives data to and from the first storage device the third control section including
a third electro-optical conversion section that converts an electric signal as the data into an optical signal, and
a third opto-electric conversion section that converts, into electric signals, optical signals that are transmitted from the fourth control section and the second wireless transmission/reception section,
the fourth control section including
a fourth electro-optical conversion section that converts an electric signal as the data into an optical signal, and
a fourth opto-electric conversion section that converts, into electric signals, optical signals that are transmitted from the third control section and the second wireless transmission/reception section,
a third transmission line that connects the third control section to the fourth control section and connects the third control section to the second wireless transmission/reception section, the third transmission line being a third optical branching line including an optical branch section that branches the optical signal output by the third electro-optical conversion section into both directions to the fourth opto-electric conversion section of the fourth control section and to the second wireless transmission/reception section,
a fourth transmission line that connects the fourth control section to the third control section and connects the fourth control section to the second wireless transmission/reception section, the fourth transmission line being a fourth optical branching line including an optical branch section that branches the optical signal output by the fourth electro-optical conversion section into both directions to the third opto-electric conversion section of the third control section and to the second wireless transmission/reception section, and
a housing including the second data storage section, the third control section, the second communication section, the fourth control section, the second wireless transmission/reception section, the third transmission line, and the fourth transmission line.

12. A data processing system comprising:
a first host device for processing data;
a second host device for processing data;
a first storage device; and
a second storage device that is provided in a predetermined direction with respect to the first storage device, wherein
the first storage device includes
a first data storage section that stores data,
a first control section that controls reading and writing the data from and into the first data storage section,
a first communication section that is connected to the first host device for processing data of the first data storage section and for requesting the first data storage section to read and write data,
a second control section that transmits and receives the data to and from the first control section and the first communication section,
a first wireless transmission/reception section that is directly connected to the first and second control sections respectively, is directed toward the predetermined direction, and wirelessly transmits and receives data to and from the second storage device,
the first control section including
a first electro-optical conversion section that converts an electric signal as the data into an optical signal, and
a first opto-electric conversion section that converts, into electric signals, optical signals that are transmitted from the second control section and the first wireless transmission/reception section,
the second control section including
a second electro-optical conversion section that converts an electric signal as the data into an optical signal, and
a second opto-electric conversion section that converts, into electric signals, optical signals that are transmitted from the first control section and the first wireless transmission/reception section,
a first transmission line that connects the first control section to the second control section and connects the first control section to the first wireless transmission/reception section, the first transmission line being a first optical branching line including an optical branch section that branches the optical signal output by the first electro-optical conversion section into both directions to the second opto-electric conversion section of the second control section and to the first wireless transmission/reception section,
a second transmission line that connects the second control section to the first control section and connects the second control section to the first wireless transmission/reception section, the second transmission line being a second optical branching line including an optical branch section that branches the optical signal output by the second electro-optical conversion section into both directions to the first opto-electric conversion section of the first control section and to the first wireless transmission/reception section, and
a housing including the first data storage section, the first control section, the first communication section, the second control section, the first wireless transmission/reception section, the first transmission line, and the second transmission line, and
the second storage device includes
a second data storage section that stores data,
a third control section that controls reading and writing the data from and into the second data storage section,
a second communication section that is connected to the second host device for processing data of the second data storage section and for requesting the second data storage section to read and write data,
a fourth control section that transmits and receives the data to and from the third control section and the second communication section, and
a second wireless transmission/reception section that is directly connected to the third and fourth control sections respectively, is directed toward a direction of the first storage device, and wirelessly transmits and receives data to and from the first storage device
the third control section including
a third electro-optical conversion section that converts an electric signal as the data into an optical signal, and
a third opto-electric conversion section that converts, into electric signals, optical signals that are transmitted from the fourth control section and the second wireless transmission/reception section,
the fourth control section including
a fourth electro-optical conversion section that converts an electric signal as the data into an optical signal, and a fourth opto-electric conversion section that converts, into electric signals, optical signals that are transmitted from the third control section and the second wireless transmission/reception section, a third transmission line that connects the third control section to the fourth control section and connects the third control section to the second wireless transmission/reception section, the third transmission line being a third optical branching line including an optical branch section that branches the optical signal output by the third electro-optical conversion section into both directions to the fourth opto-electric conversion section of the fourth control section and to the second wireless transmission/reception section, a fourth transmission line that connects the fourth control section to the third control section and connects the fourth control section to the second wireless transmission/reception section, the fourth transmission line being a fourth optical branching line including an optical branch section that branches the optical signal output by the fourth electro-optical conversion section into both directions to the third opto-electric conversion section of the third control section and to the second wireless transmission/reception section, and a housing including the second data storage section, the third control section, the second communication section, the fourth control section, the second wireless transmission/reception section, the third transmission line, and the fourth transmission line.

13. The storage device array according to claim 11, wherein the first storage device includes a first detection section, the second storage device includes a second detection section, the second control section transmits and receives data to and from the second storage device when the first detection section detects the second detection section, the fourth control section transmits and receives data to and from the first storage device when the second detection section detects the first detection section, and the first detection section and the first wireless transmission/reception section and the second detection section and the second wireless transmission/reception section are arranged respectively such that the first wireless transmission/reception section and the second wireless transmission/reception section oppose each other when the first storage device and the second storage device are arranged such that the first detection section and the second detection section detect each other.

* * * * *